(12) United States Patent
Gyoten et al.

(10) Patent No.: US 6,579,639 B1
(45) Date of Patent: Jun. 17, 2003

(54) POLYMER ELECTROLYTE FUEL CELL

(75) Inventors: Hisaaki Gyoten, Shijonawate (JP); Makoto Uchida, Hirakata (JP); Eiichi Yasumoto, Kyoto (JP); Hiroki Kusakabe, Sakai (JP); Yasushi Sugawara, Higashiosaka (JP); Yoshihiro Hori, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 101 days.

(21) Appl. No.: 09/587,001

(22) Filed: Jun. 5, 2000

(30) Foreign Application Priority Data

Jun. 7, 1999 (JP) ............................................. 11-159057

(51) Int. Cl.[7] .......................... H01M 2/00; H01M 2/02; H01M 2/14; H01M 4/86; H01M 4/90
(52) U.S. Cl. .............................. 429/34; 429/30; 429/38; 429/39; 429/42
(58) Field of Search ............................. 429/34, 30, 38, 429/39, 42

(56) References Cited

U.S. PATENT DOCUMENTS 5,460,896 A * 10/1995 Takada et al. ................. 429/33
5,474,857 A * 12/1995 Uchida et al. ................. 429/33

* cited by examiner

Primary Examiner—Patrick Ryan
Assistant Examiner—Julian Mercado
(74) Attorney, Agent, or Firm—Akin Gump Strauss Hauer & Feld, L.L.P.

(57) ABSTRACT

A polymer electrolyte fuel cell comprising an anode, a cathode, a polymer electrolyte membrane interposed between the anode and the cathode, an anode-side separator plate having a gas flow path to supply fuel gas to the anode and a cathode-side separator plate having a gas flow path to supply oxidant gas to the cathode. Each of the anode and the cathode comprises a catalyst layer in contact with the polymer electrolyte membrane, an electrode supporting material having gas permeability and electronic conductivity, and a water repellent layer interposed between the catalyst layer and the electrode supporting material. The water repellent layer has through holes through which the catalyst layer and the electrode supporting material are electrically connected.

3 Claims, 4 Drawing Sheets

POLYMER ELECTROLYTE FUEL CELL

BACKGROUND OF THE INVENTION

The present invention relates to a polymer electrolyte fuel cell for use in portable power sources, distributed power sources, cogeneration systems and the like, and more particularly to improvements in its electrodes.

The fuel cell is generally constituted of unit cells comprising an electrolyte, a pair of electrodes which are disposed on both sides of the electrolyte and have gas diffusing and catalytic functions, an electrically conductive separator on the anode side that has a gas flow path to supply fuel like hydrogen to one electrode, and an electrically conductive separator on the cathode side that has a gas flow path to supply oxidant gas like air to the other electrode. And electricity and heat are simultaneously generated by electrochemically reacting the fuel and the oxidant.

In the polymer electrolyte fuel cell using a polymer electrolyte membrane as electrolyte to conduct hydrogen ions, a pair of catalyst layers, which are mainly composed of carbon powder with a platinum group catalyst carried thereon, are in closely attached to opposite side of the electrolyte membrane. Furthermore, a pair of electrode supporting materials which has both gas permeability and electric conductivity are placed closely on the respective outsides of the catalyst layers. The electrode supporting material and the catalyst layer constitute each electrode. Generally used electrode materials include carbon paper with a relatively high elasticity like paper, flexible carbon cloth and carbon felt.

Outside the electrodes are placed electrically conductive separator plates so as to mechanically clamp a membrane electrode assembly (MEA) and ca use the assembly to electrically connect with adjacent assemblies in series. A carbon plate is generally used as the separator. In the area where the separator plate and the electrode are in contact with each other, there is formed a gas flow path to supply the reaction gas and carry away generate gas or excessive gas.

In the electrode where hydrogen is supplied (anode), hydrogen that is supplied to the catalyst layer through the electrode supporting material from the gas flow path is oxidized into hydrogen ions. These hydrogen ions are transported to the electrode where air is supplied (cathode) by the electrolyte membrane. At the cathode, the hydrogen ions and oxygen react with each other to form water on the catalyst layer. The electrons that generate then flow from the anode to the cathode through an outside circuit. To have the process proceed efficiently, the electrode has to be provided with a suitable air passage to supply the reaction gas to the reaction area of the catalyst layer and efficiently remove drain gases such as water vapor formed in the catalytic reaction.

Hitherto, a polyfluorocarbon-type compound like polytetrafluoroethylene (PTFE) has been used as water repellent. That is, the polymer was mixed in the electrode supporting material or catalyst layer to secure the aforesaid air passage. To be concrete, carbon paper constituting the electrode supporting material is impregnated or coated with a colloid dispersion of a polyfluorocarbon-type compound and dried to remove the solvent, followed by heat treatment at 350 to 450° C. to fix the polyfluorocarbon-type compound on the carbon paper. To impart water repellency to the catalyst layer, the following process has been adopted. A polyfluorocarbon-type compound repellent is fixed beforehand in carbon powder other than the platinum-carrying carbon powder. Then, the former carbon powder and the platinum-carrying carbon powder are evenly mixed. The polyfluorocarbon-type compounds that have been used include, in addition to PTFE, other polymers in which physical properties like glass transition point are changed by modifying various substituents like perfluoromethyl group.

In recent years, attempts have been made to control the water repellency of the component parts of the electrode thereby to efficiently discharge formed water by giving water repellency treatment to the electrode supporting material having gas permeability and electronic conductivity on the side that comes in contact with the catalyst layer and giving hydrophilic treatment with $SiO_2$ to the other part.

In the method of giving water repellency treatment to the surface of electrically conductive cell component parts such as carbon particles, carbon fabrics or the like using a dispersion of a polyfluorocarbon-type compound like PTFE, it is difficult to coat the whole surface of the cell component parts with the polyfluorocarbon-type compound. Microscopically viewed, the component parts have sites not covered with the polyfluorocarbon-type compound. Those sites get wet in time, reducing the overall repellency. If the amount of the polyfluorocarbon-type compound applied is increased to raise the water repellency, that will deteriorate the electric contact between carbon fibers and carbon particles, reducing the cell performance.

It is pointed out that if the electrode supporting material is given a hydrophilic treatment with $SiO_2$ or the like, the cell performance will drop probably because of the effect of the hydrophilic treatment agent. Electrode supporting materials merely subjected to such a hydrophilic treatment are low in water retention, and the cell performance is greatly influenced by changes in humidity of the supplied gas.

The polymer electrolyte fuel cell forms water in the electrodes during operation. The formed water evaporates and mixes with the supplied gas and discharged as drain gas. As a result, there arises a difference in humidity between the upstream side and the downstream side of the gas supply in a cell stack. This is more noticeable as the.utilization of gas increases. To raise the efficiency of the cell, an electrode is needed that is not so influenced by the humidity of the supplied gas.

BRIEF SUMMARY OF THE INVENTION

In view of the prior art described above, including the disadvantages and deficiencies, it is an object of the present invention to provide a polymer electrolyte fuel cell that can maintain the cell performance at a high level.

The present invention provides a polymer electrolyte fuel cell comprising an anode, a cathode, a polymer electrolyte membrane interposed between the anode and the cathode, an anode-side separator plate having a gas flow path to supply fuel gas to the anode and a cathode-side separator plate having a gas flow path to supply oxidant gas to the cathode, wherein each of the anode and the cathode comprises a catalyst layer in contact with the polymer electrolyte membrane, an electrode supporting material having gas permeability and electronic conductivity, and a water repellent layer interposed between the catalyst layer and the electrode supporting material, the water repellent layer having through holes through which the catalyst layer and the electrode supporting material are electrically connected.

In a preferred mode of the present invention, the aforesaid through holes are distributed in such a manner that the average interval between the holes is smaller than the width of the gas flow path of the separator plate. That is, it is preferable that through the through holes distributed in such a state, the catalyst layer and the electrode supporting material are electrically connected with each other.

In another preferred mode of the present invention, the electrode supporting material is constituted of carbon fibers that have been subjected to a treatment for enlarging the surface area.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1A:
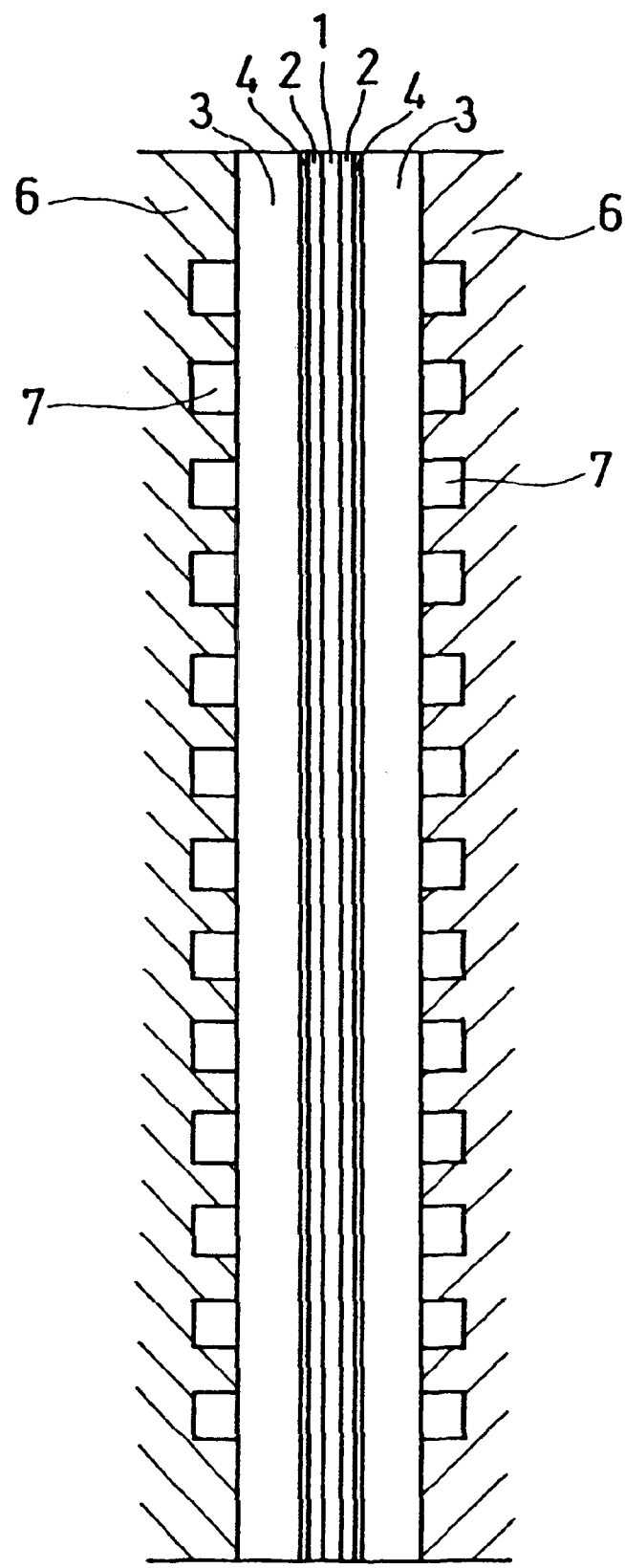
FIG. 1A is a sectional view schematically showing a fuel cell of the present invention.
Figure 1B:
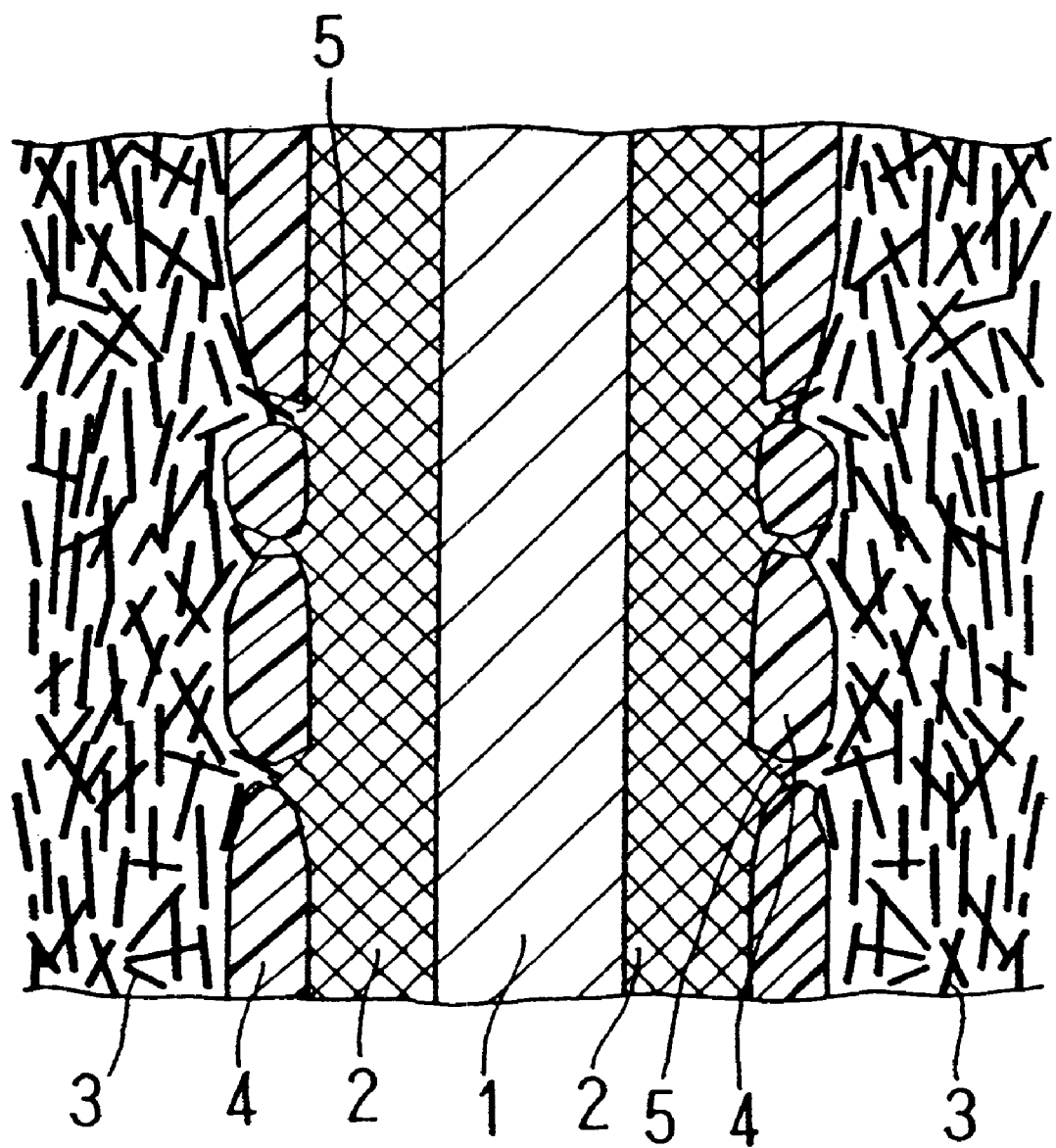
FIG. 1B is an enlarged cross-sectional view of the main part of an MEA of the fuel cell FIG. 1A.

The cross section of the essential part of the polymer electrolyte fuel cell according to the present invention is schematically shown in FIG. 1B. As shown, a water repellent layer 4, which is composed of a water repellent material and has through holes 5, is provided between an electrode supporting material 3 and a catalyst layer 2 formed in contact with a polymer electrolyte membrane 1. The through hole 5 extends from the electrode supporting material side to the catalyst layer side. This arrangement permits supplying of reaction gases such as hydrogen and oxygen to the catalyst layer and discharging of water vapor formed in the catalytic reaction through the holes 5 provided scattered in the water repellent layer. Further, if the water repellent layer is formed with water repellent material such as teflon sheet commercially available in the name of GORETEX, gas change is performed between the catalyst layer and the electrode supporting material through the micropores in the layer. Moreover, provision of the layer made of a water repellent material between the catalyst layer and the electrode supporting material can drastically improve the water repellency of the electrode as compared with the prior art and also can keep down the deterioration with time. As a result, the water formed in the catalyst layer is confined in the catalyst layer, therefore even if a dry gas with a relatively low humidity is supplied to the electrode, the deterioration in performance of the electrolyte in the electrolyte membrane and catalyst layer due to drying can be supressed. Meanwhile, the formed water overflowing from the catalyst layer is forced out into the electrode supporting material under water pressure through relatively large holes provided on the water repellent layer, and evaporates into the supplied gas and removed.

A preferred method of producing an electrode having the above described water repellent layer according to the present invention comprises the steps of forming a water, repellent layer on one side of the electrode supporting material and the step of applying a catalyst layer on the water repellent layer formed on the surface of the electrode supporting material. The water repellent layer can be formed in the following methods.

1) First method includes atomizing a water repellent polyfluorocarbon-type compound, especially an aqueous dispersion of PTFE, followed by spraying the same on one side of the electrode supporting material heated to 95 to 100° C. It is desirable that after a water repellent layer is formed, the material is heated up to 250 to 380° C. so as to enhance the adhesion of the water repellent layer to the electrode supporting material.

2) Second method comprises coating one side of the electrode supporting material with an organic solvent solution or slurry of fluorinated pitch, followed by drying to form a water repellent layer.

3) Third method comprises adhering a thin sheet (about 5 $\mu$m or less in thickness) of a water repellent polyfluorocarbon-type compound, especially PTFE, onto one side of the electrode supporting material by hot pressing. It is desirable that the PTFE sheet to be used is provided beforehand with a number of holes of some 0.1 $\mu$m to 1.0 mm in diameter.

The water repellent layer of the present invention is preferably 1 $\mu$m to 50 $\mu$m in thickness and has through holes of some 0.1 $\mu$m to 1.0 mm in diameter in such a number that the total area of the through holes per unit area is about 0.05 to 0.5 $cm^2/cm^2$.

If an electrode supporting material with a water contact angle of not larger than 90 degrees, that is, a hydrophilic material, the formed water forced out into the electrode. supporting material spreads rapidly in the electrode supporting material, which enlarges the evaporation area thereby to promote the evaporation of water.

In a preferred embodiment of the present invention, the surface area of the electrode supporting material is further increased by activation treatment of the electrode supporting material or by incorporation with carbon particles or baked decomposition product of organic binder. That further increases the evaporation area and the ability to retain formed water.

Now, the embodiments of the present invention will be described in detail. It is understood that the present invention is not limited to the specific embodiments thereof.

EXAMPLE 1

A carbon powder with a particle size of not greater than several microns was impregnated with an aqueous solution of chloroplatinic acid, and the platinum catalyst was carried on the surface of the carbon powder by reducing treatment. This gave a catalyst carbon powder. The ratio of carbon to the carried platinum was about 2:1 by weight. Then, a slurry with carbon powder mixed into the aqueous dispersion of polytetrafluoroethylene (PTFE) was forced-stirred, dried and heat-treated. Thus obtained was a water repellent carbon powder with PTFE sticking to the carbon powder. The above-mentioned catalyst carbon powder and the water repellent carbon powder were evenly mixed at a ratio of some 3:1 by weight. This mixture was mixed with butyl acetate and kneaded to give an ink for preparing a catalyst layer.

Then, a carbon paper of 500 microns thick with porosity at 50 to 80% available from Toray Industries, Inc. that would be an electrode supporting material was heated from under by infrared ray irradiation. With the surface temperature maintained at 95° C. to 100° C., the aqueous dispersion of PTFE atomized by a spraying apparatus was dropped over the upper side of the carbon paper. The atomized aqueous dispersion of PTFE had the water evaporated on the carbon paper, with PTFE depositing to form a water repellent material layer on the upper surface of the carbon paper. When the surface temperature of the carbon paper was raised to not lower than 110° C., the solid contents of PTFE did not stick to the surface of the carbon paper. When the temperature was not higher than 80° C., the aqueous dispersion penetrated into the carbon paper, making the carbon paper water-repellent down to the inner portion.

By adjusting the time for atomizing and depositing the aqueous PTFE dispersion on the carbon paper as described above, a water repellent layer of some 30 μm thick was formed the carbon paper. When this water repellent layer was examined under the microscope, the water repellent layer was found to be uneven in thickness, with some holes partially exposed on the carbon paper. Then, for the purpose of improving the adhesion on the carbon paper of the water repellent layer, the carbon paper with the water repellent layer formed thereon was heated for a short time in an atmosphere of 250 to 380° C. If the heating time was prolonged, some holes exposed on the water repellent carbon paper were clogged, and in extreme cases softened PTFE penetrated into the carbon paper. And the water repellent layer itself turned into a close continuous film, losing gas permeability.

In this way, the carbon paper with the water repellent layer made of porous PTFE formed on one side was coated with the ink for forming a catalyst layer on the water repellent layer by the spray coating technique. While the screen printing process could do that, the spray coating technique was better in uniformity of the coated surface. The amount to be applied of the catalyst layer was set in such a way that the amount of platinum was 0.5 mg/cm$^2$. The materials suitable for formation of the water repellent layer include not only PTFE but also high water repellent materials such as a copolymer of perfluoroethylene and perfluoropropylene.

To form another water repellent layer, fluorinated pitch powder, one of the most water repellent materials, was added to an organic solvent based on acetone and prepared into a slurry. This slurry was applied on the same carbon paper as described above and dried to form a water repellent layer. The fluorinated pitch used was one obtained by reacting fluorine gas with a coal-tar pitch. The water repellent layer constituted with this fluorinated pitch powder was some 20 μm in thickness, with the carbon paper partially exposed. The water repellent layer side of the carbon paper was coated with a catalyst layer so that the amount of platinum was 0.5 mg/cm$^2$. The fluorinated pitch is molecular crystals and is soluble in fluorocarbon solvents like perfluorobenzene. Therefore, a water repellent layer was possible to form by the following method. That is, the solution of fluorinated pitch was atomized by the spraying apparatus and applied on one side of the carbon paper, followed by drying.

As another method of forming the water repellent layer, the following process was performed. PTFE sheet was extended to a thickness of some 35 μm. This sheet was adhered on one side of the carbon paper by hot pressing. By changing the hot pressing conditions, the carbon paper with the water repellent layer formed thereon was controlled with regard to the gas permeability of the carbon paper. When the pressure and the temperature of the hot press were raised, that resulted in increased holes through which the catalyst layer and the electrode supporting material came in electrically direct contact with each other, that is, exposed parts on the carbon paper.

In another water repellent layer forming method, a large number of holes of 0.5 to 1.0 mm in diameter were punched through the extended PTFE sheet before it was adhered on the carbon paper. That ensured the formation of holes through which the catalyst layer and the electrode supporting material came in direct contact with each other. Different PTFE sheets with hole-to-hole intervals smaller and larger than the width—2 mm—of the gas flow path formed on the separator plate made of carbon to a large size were prepared, with the hole-to-hole interval ranging from one to three mm.

This technique is applicable not only to the extended PTFE sheet but also to porous PTFE sheets used as sealing material and also sheets with fibers of a water repellent material microscopically woven into a mesh structure. The carbon paper bonded to the water repellent material sheet with such holes punched therethrough was coated with a catalyst layer so that the amount of platinum was 0.5 mg/cm$^2$.

The four kinds of electrodes thus prepared, that is, (a) electrode with a water repellent layer formed by spraying an aqueous dispersion of PTFE, (b) electrode with a water repellent layer formed of fluorinated pitch powder, (c) electrode with a water repellent layer formed by bonding an extended PTFE sheet, and (d) electrode with a water repellent layer formed by bonding an extended PTFE sheets with holes punched therethrough. These four kinds of electrodes were each hot pressed under a pressure of 20 kgf/cm$^2$ at 125° C. with a hydrogen ion conductive polymer electrolyte membrane of perfluorocarbon sulfonic acid (membrane thickness of 15 μm, available from DuPont under a name of Nafion) sandwiched between the sheets. Thus, membrane electrode assemblies (MEA) were made. The electrode area was 5 cm×5 cm. With these MEA sandwiched between carbon separator plates and a silicone rubber gasket placed around MEA, fuel cells were fabricated. The fuel cells fabricated with the electrodes "a", "b", "c" and "d" are designated as A, B, C and D, respectively.

Figure 2:
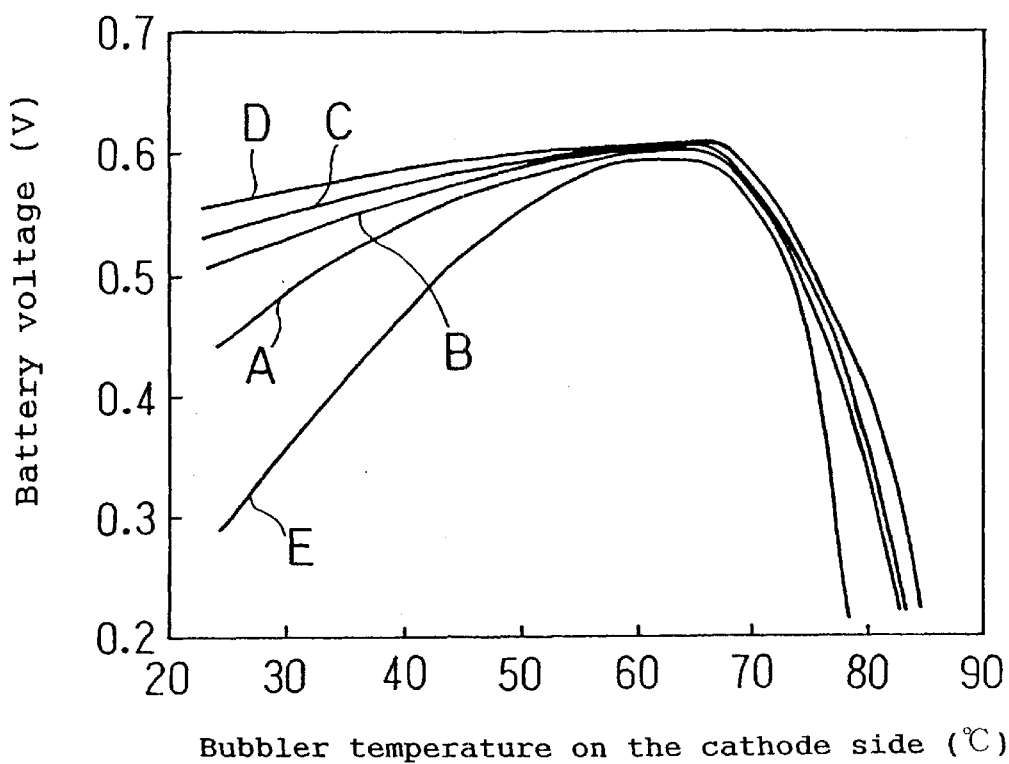
FIG. 2 is a plot showing cell voltage as a function of cathode bubbler temperature for polymer electrolyte fuel cell of the first embodiment of the present invention.

Then, the performance of these cells was tested. The test results are shown in FIG. 2. The tests were carried out under the following conditions. Pure hydrogen was used as fuel gas, and air was used as oxidant gas, and they were each humidified by bubbling in water and then supplied to the electrodes. The utilization of hydrogen was set at 70%, the utilization of air at 30%, the temperature of the cell at 75° C., the current density at 0.7 A/cm$^2$, and the temperature of the water used for humidification on the anode side (hereinafter referred to as bubbler temperature) at 75° C. In FIG. 2, the results are plotted with the bubbler temperature on the cathode side on the abscissa. As shown, evaluations were made of the effect on the cell performance of humidifying conditions for the oxidant gas to be supplied to the cathode.

As is evident from FIG. 2, the cells A to D using the electrodes "a" to "d" according to the present invention are all improved in comparison with the cell E using the conventional electrode "e" in performance at low bubbler temperatures, that is, when drier air is supplied. In cell D using the electrode "d", it was found that a higher performance is obtained with the holes provided in the extended PTFE sheet at an interval smaller than the width of the gas supply channel.

EXAMPLE 2

Example 1 shows that the performance of the cell with low-humidified air used can be improved by placing a water repellent layer between the catalyst layer and the electrode supporting material. In the present example, a treatment to increase the surface area of the electrode supporting material was given in order to improve the performance of the cell when high-humidified air was used.

In this example, carbon paper made of polyacrylonitrile-type carbon fibers was used as electrode supporting material. First, a 5% by weight aqueous solution of carboxymethyl-cellulose (CMC) was rubbed into the carbon paper and dried. Then the carbon paper was subjected to a heat treatment for 6 hours at 800° C. to carbonize CMC, while nitrogen gas being flown. This treatment was repeated three times to have carbonized CMC stick to the electrode supporting material, that is, carbon fibers in the carbon paper. This surface treatment increased the specific surface area of the carbon paper to 3,500 $cm^2/g$, which was some 1.5 times as large as that of the untreated carbon paper that had a specific surface area of 2,300 $cm^2/g$. Furthermore, when an ethylalcohol solution of polyvinyl butyral was used in place of CMC, the specific surface area increased to 3,700 $cm^2/g$. When the atmospheric gas for the heat treatment was replaced with air, the specific surface area of the carbon paper decreased instead. It indicates that it is necessary to perform the heat treatment in a low-oxidizing gas.

Then, to further increase the specific surface area, a carbon powder with a high specific surface area was introduced into the electrode supporting material. Ethanol was added to acetylene black powder with a specific surface area of 60 $m^2/g$ and kneaded into a paste. The paste was rubbed into the carbon paper and dried, followed by baking for 4 hours at 800° C. in a stream of nitrogen. The carbon paper thus obtained was 2,400 $cm^2/g$ in specific surface area.

To reinforce the adhesion on the carbon fibers of carbon powder, the following method was also tried. One g of acetylene black powder with a specific surface area of 60 $m^2/g$ was added to 100 g of a 5% by weight aqueous solution of CMC and kneaded into a paste. This paste was rubbed into the carbon paper, dried and baked. The specific surface area of the resultant electrode supporting material was about 28,000 $cm^2/g$.

As another attempt to increase the specific surface area, the carbon fibers were put to an activation treatment. The treatment was the following water vapor activation. While nitrogen being flown into the electric furnace, water vapor was introduced into carbon paper heated to 1,000° C. Water vapor was introduced for 30 to 60 seconds, and then the carbon paper was allowed to cool. The carbon paper thus obtained was about 100 to 200 $m^2/g$ in specific surface area.

Figure 3:
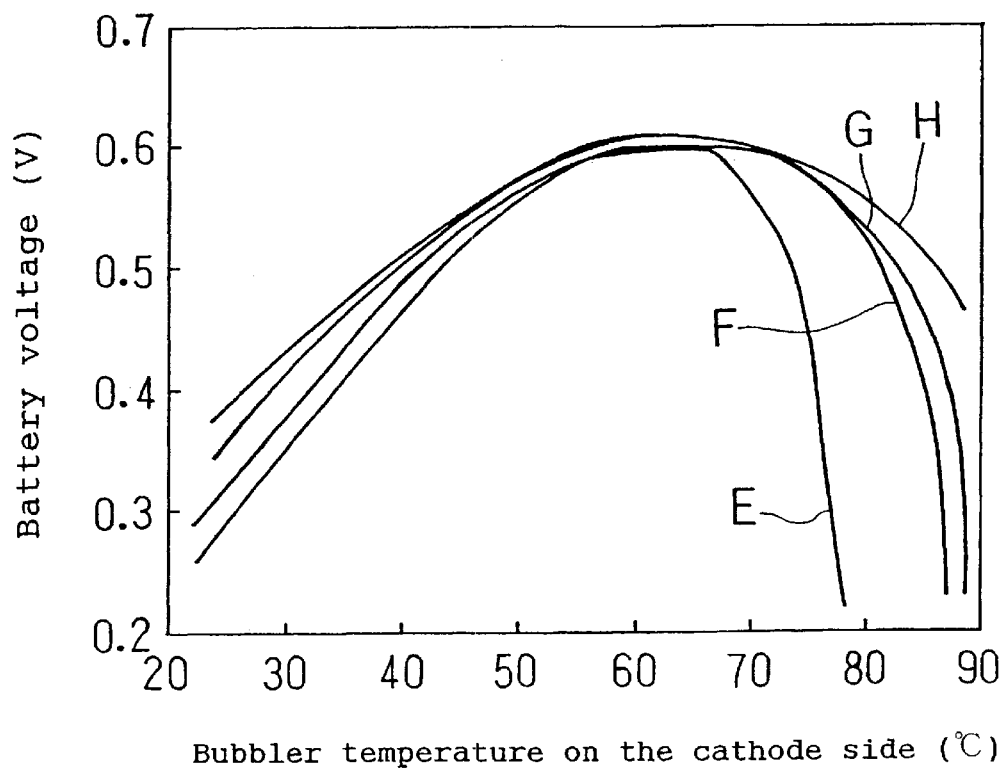
FIG. 3 is a plot showing cell voltage as a function of cathode bubbler temperature for polymer electrolyte fuel cell of the second embodiment of the present invention.

These carbon papers were coated with the same ink for forming a catalyst layer as in Example 1 so that the amount of platinum was 0.5 $mg/cm^2$. The electrolyte membrane was sandwiched between a pair of carbon paper thus obtained and hot pressed into MEA. Cells fabricated using this MEA were tested under the same conditions as in Example 1. The results are shown in FIG. 3. The cells fabricated using electrodes with carbonized CMC stuck thereto, electrodes with carbon powder introduced thereinto and electrodes with activation-treated carbon paper are designated as F, G and H, respectively. The cell E with conventional constitution with carbon paper not being subjected to treatment for enlarging the specific surface area rapidly dropped in performance as the humidity of the air to be supplied was increased. That is because the formed water stays in the catalyst layer or carbon paper, hindering the supply of air. In comparison with that, the cells using the carbon paper subjected to a treatment for enlarging the specific surface area were all improved in performance when the humidity of the air to be supplied was high.

Figure 4:
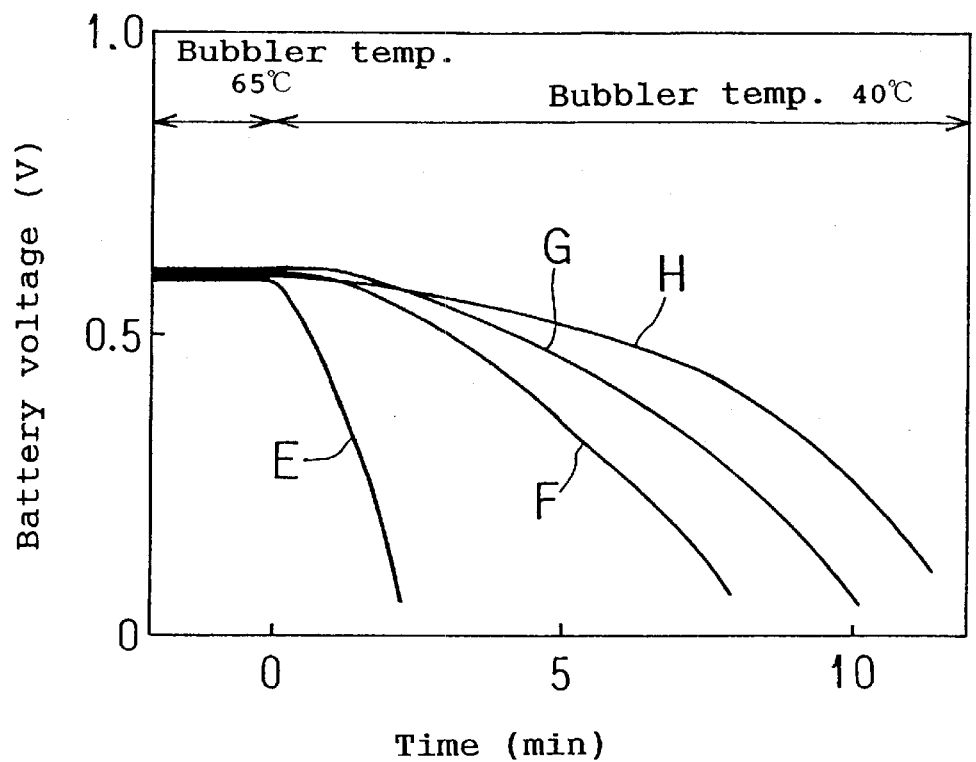
FIG. 4 is a plot showing cell voltage as a function of time for polymer electrolyte fuel cell of the second embodiment of the present invention.

Then, while the bubbler temperature on the air side maintained at 65° C., the cell operation were continued. After that, the bubbler temperature was swichted to 40° C., and the changes in cell voltage were traced. As shown in FIG. 4, all the cells dropped to 0.3 V or lower in 10 minutes. While the conventional cell using electrodes not being subjected to treatment for enlarging the specific surface area suddenly dropped in performance immediately after the bubbler temperature was switched, the cells according to the present invention maintained their performance for several minutes after the switchover of the bubbler temperature. That is because the water retention capacity of the carbon paper rose with increase in the specific surface area and therefore even when dry air began to be supplied, the catalyst layer and electrolyte membrane did not dry soon, maintaining the performance of the cell for a while. In the actual fuel cell power generator system, it can happen that when the system goes out of harmony with the fuel reformer or humidifier at starting or stopping of the system, dry gas is temporarily supplied. Even in such a case, the cell according to the present invention does not cause the system to drop in performance if the out-of-harmony time is short.

In the present example, the carbon paper made of PAN-type carbon fibers was used as electrode supporting material. According to the present invention, with carbon cloth, carbon felt constituted of pitch-type carbon fibers or various carbon particles, the cell performance can be made stable against changes in the humidity of the gas by enlarging the surface area of the cloth or the felt.

EXAMPLE 3

Figure 5:
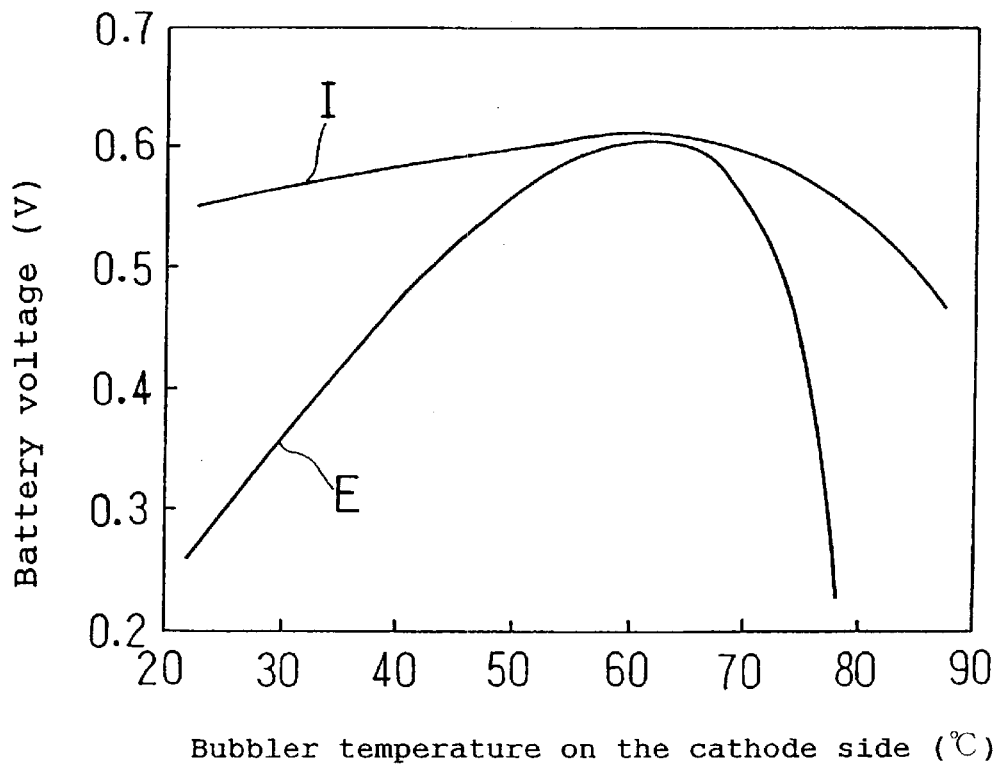
FIG. 5 is a plot showing cell voltage as a function of cathode bubbler temperature for polymer electrolyte fuel cell of the third embodiment of the present invention.

The polymer electrolyte fuel cell is different in humidity between the upstream side and the downstream side of the supplied gas inside the electrode. To keep the current density as uniform as possible all over the electrode and to obtain a cell with a high performance, it is necessary to constitute MEA that will not drop in performance even when there occur changes in humidity of the supplied gas flowing through the gas flow path. In the present example, MEA was made that had the water repellent layer of Example 1 formed on the carbon paper with an enlarged specific surface area described in Example 2. The means used for enlarging the specific surface area of the carbon paper was the above described water vapor activation treatment. The water repellent layer was formed by hot pressing the aforesaid extended PTFE. Fuel cells were fabricated under the same condition as in Example 1 except for that. FIG. 5 shows the test results of the cell. The tests were carried out under the same conditions as in Example 1. When compared with the cell E with conventional constitution, the cell I was substantially improved in performance even when the supplied air was in a dry state.

Then, a cell stack was fabricated with cells using an electrode supporting material subjected to a treatment for enlarging the surface area and having a constitution such that a water repellent layer was introduced at the same time. The performance of the cell stack thus fabricated was tested. A baked carbon plate of 4 mm in thickness was machined to form a flow path for gas on one side and a flow path for cooling water on the other side. This carbon separator plate and MEA with an electrode area of 100 $cm^2$ were stacked one on another to fabricate a cell stack with 10 cells connected in series. End plates of stainless steel were put on the two sides of the cell stack, and the two end plates were clamped with bolts and nuts under a pressure of 20 kgf/cm². The other details were the same as those in Example 1.

The cell stack was tested under the same conditions as in Example 1. Similar to the unit cell, the aforesaid cell stack was found to exhibit a sufficient performance even when the supplied air was in a dry state, with the output variation between the cells substantially improved. The conventional cell stack with 10 cells stacked was ±50 mV in output voltage variation when the load was 0.5 A/cm², while the cell stack according to the present invention was ±30 mV in output voltage variation. In the cell stack, gas is supplied to the respective cells in parallel, but the gas flow varies because of delicate differences in configuration of the flow path and wettability of the electrodes in the respective cells. In cells where the gas flow decreases, the difference will greatly increase in humidity between the upstream and downstream of the supplied gas. Probably, that is one of the causes for output voltage variation. In this respect, the cell stack according to the present invention was found improved.

Examples 1, 2 and 3 showed the effect on the stability of cell performance of the humidifying conditions or humidity on the cathode side. But on the anode side, too, hydrogen gas is consumed on the way in the gas flow path of the unit cell, and the downstream side tends to be overhumidified as compared with the upstream side. This tendency is especially noticeable as the utilization increases, and it goes without saying that the present invention is effective in improving the performance on the anode side as on the cathode side.

As set forth above, according to the present invention, it is possible to provide a polymer electrolyte fuel cell that can maintain its performance irrespective of changes in vapor pressure of water vapor contained in the supplied gas. Also, the present invention can contribute to stabilization of the operating conditions of the fuel cell and improvement of the system efficiency.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising an anode, a cathode, a polymer electrolyte membrane interposed between the anode and the cathode, an anode-side separator plate having a gas flow path to supply fuel gas to the anode and a cathode-side separator plate having a gas flow path to supply oxidant gas to the cathode, wherein each of the anode and the cathode comprises a catalyst layer in contact with the polymer electrolyte membrane, an electrode supporting material having gas permeability and electronic conductivity, and an insulating water repellent layer interposed between the catalyst layer and the electrode supporting material, said water repellent layer having through holes of sufficient size to allow water vapor to discharge therethrough and to electrically connect the catalyst layer and the electrode supporting material.

2. The polymer electrolyte fuel cell in accordance with claim 1, wherein said through holes are distributed in such a manner that an average interval between the holes is smaller than a width of the gas flow path on the respective separator plate.

3. The polymer electrolyte fuel cell in accordance with claim 1, wherein said electrode supporting material comprises carbon fibers treated for enlarging a surface area of the electrode supporting material in order to promote evaporation and the ability to retain formed water.

* * * * *